Patented Oct. 14, 1952

2,614,108

UNITED STATES PATENT OFFICE 2,614,108

1-AMIDO-6.7 DICHLORO ANTHRAQUINONE DYESTUFFS

Walter Jenny, Reinach, and Walter Kern, Sissach, Switzerland, assignors to Ciba Limited, Basel, Switzerland, a Swiss firm No Drawing. Application July 17, 1950, Serial No. 174,365. In Switzerland July 22, 1949

6 Claims. (Cl. 260—372)

This invention is based on the observation that valuable vat dyestuffs are produced when 1-amino-6:7-dichloranthraquinone is treated with such an acylating agent as provides the radical of a benzoic acid substituted in para-position to the CO-group by a phenylsulfone group or a halogen atom.

The 1-amino-6:7-dichloranthraquinone serving as starting material for the present process can be produced by mononitration of 2:3-dichloranthraquinone and subsequent reduction of the 1-nitro-6:7-dichloranthraquinone obtained.

As acylating agents which provide the radical of a benzoic acid substituted in para-position to the CO-group in the manner specified, there can be employed advantageously the reactive functional derivatives of the acids concerned, for example the acid halides and especially the acid chlorides.

The reaction can suitably be carried out in an indifferent high boiling solvent, such as mono-, di- or trichlorbenzene, nitrobenzene or naphthalene, at a raised temperature, for example between 100° C. and the boiling point of the solvent used, if desired in the presence of an acid-binding and/or catalytically active agent, such as a tertiary base (pyridine or dimethylaniline).

The products obtained are valuable vat dyestuffs of the general formula

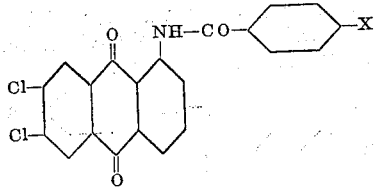

in which X indicates a halogen atom or a group —$SO_2$—R′ in which R′ represents a benzene nucleus. They can be used as pigment dyestuffs and also for the dyeing and printing of a wide variety of fibers of animal or vegetable nature, especially for the dyeing and printing of cotton, linen, artificial silk and staple fiber from regenerated cellulose. They can also, if desired, be used for dyeing and printing in the form of their leuco ester salts which can be produced in the customary manner, employing a process known for this class of dyestuff.

The following examples illustrate the invention, the parts and percentages being by weight unless otherwise stated and the relation between parts by weight and parts by volume being the same as that between the kilogram and the liter.

EXAMPLE 1

6 parts of 1-amino-6:7-dichloranthraquinone and 6 parts of para-chlorobenzoyl chloride are distributed in 84 parts of dry nitrobenzene and the whole is stirred for three hours at 130 to 135° C. The dyestuff of the formula

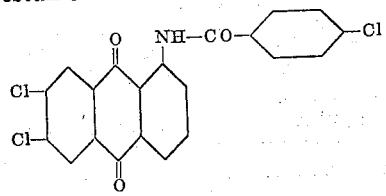

which on cooling is deposited in yellow-orange colored small needles, is filtered with suction, washed with boiling alcohol and dried. For vatting it is advantageously first reprecipitated from a solvent. It dissolves in concentrated sulfuric acid with a red color and dyes cotton from a red vat in pure yellow shades which are fast to light.

By acylation with para-diphenylcarboxylic acid a dyestuff is obtained which dyes in somewhat redder shades.

The 1-amino-6:7-dichloranthraquinone used can be produced in the following manner:

115 parts of nitration acid (a mixture of 57.5 parts of anhydrous $H_2SO_4$ and 57.5 parts of nitric acid of 98 per cent.) are gradually added with stirring in the course of one hour to a solution of 50 parts of 2:3-dichloranthraquinone in 800 parts of monohydrate. After this mixture has been stirred for a further two hours at 50 to 55° C. the product is filtered with suction and washed until neutral. The filter cake is now ground as finely as possible with a little 50 per cent. alcohol and after the addition of 30 parts of sodium sulfite and 3000 parts of water, boiled for 15 hours under reflux. The whole is then rendered alkaline with caustic soda solution, filtered hot, washed neutral and dried. By recrystallisation from ortho-dichlorobenzene and 1-nitro-6:7-dichloranthraquinone is obtained in small almost colorless needles which melt at about 290° C. (uncorrected).

Analysis

| | Calculated | Found |
|---|---|---|
| | Percent | Percent |
| C | 52.2 | 52.18 |
| H | 1.56 | 1.54 |
| N | 4.34 | 4.32 |
| Cl | 22.02 | 22.11 |

30 parts of nitro product are well ground with water and after the addition of 1400 parts of water and 300 parts of sodium hydrosulfide solution (30 per cent.) stirred for one hour at 95° C. The amino body deposited as a red precipitate is filtered hot with suction, washed neutral and dried. It crystallizes from anisole in small red needles which melt at about 282 to 283° C. (uncorrected) and corresponds to the formula

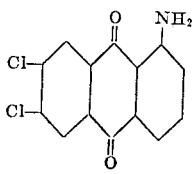

EXAMPLE 2

33 parts of diphenylsulphone-4-carboxylic acid are suspended in 450 parts of dry nitrobenzene and after the addition of 18 parts of thionyl chloride and 0.5 part of pyridine, stirred for an hour-and-a-half at 100 to 110° C. The whole is now treated with 29 parts of 1-amino-6:7-dichloranthraquinone and further stirred for two hours at 125 to 130° C. The dyestuff which is deposited on cooling in greenish-yellow small crystals, is filtered with suction, well washed with boiling alcohol and dried. It dissolves in concentrated sulfuric acid with an orange-red color and dyes cotton from a violet vat in fast greenish-yellow shades.

By the application of 4-methoxy-diphenylsulphone-4'-carboxylic acid a similar dyestuff is obtained of the formula

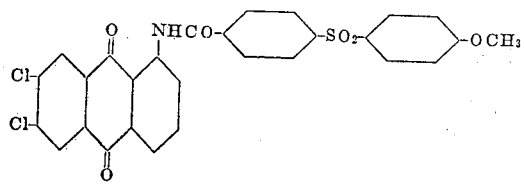

EXAMPLE 3

44 parts of 1-amino-6:7-dichloranthraquinone and 40 parts of 4-bromobenzoyl chloride are suspended in 500 parts of dry nitrobenzene. After stirring for two hours at 130 to 135° C. the dyestuff of the formula

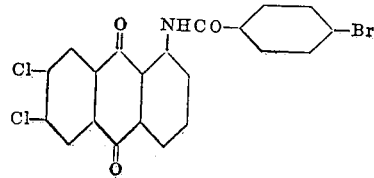

which separates in small gold-yellow needles, is filtered with suction at 20° C., well washed with boiling alcohol and dried. It dissolves in concentrated sulfuric acid with a red color and dyes cotton from a red-violet vat in yellow shades which are fast to light.

EXAMPLE 4

44 parts of 1-amino-6:7-dichloranthraquinone and 35 parts of 4-fluorobenzoyl chloride are suspended in 600 parts of dry nitrobenzene. After stirring for two hours at 120 to 130° C. the dyestuff of the formula

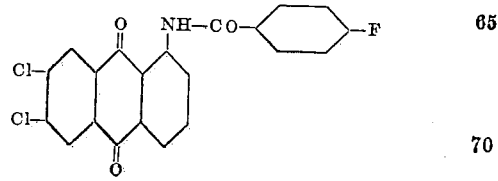

which is deposited as a yellow crystalline powder, is filtered at 20° C. with suction, well washed with boiling alcohol and dried. It dissolves in concentrated sulfuric acid with a red color and dyes cotton from a violet vat in yellow shades which are fast to light.

EXAMPLE 5

36 parts of 4-iodobenzoic acid are suspended in 400 parts of dry nitrobenzene and after the addition of 22 parts of thionyl chloride and 0.5 part of pyridine stirred for 1½ hours at 80 to 90° C. The whole is now treated with 29 parts of 1-amino-6:7-dichloranthraquinone and further stirred for two hours at 125 to 130° C. The dyestuff which on cooling is deposited as a yellow crystalline powder, is filtered with suction, well washed with boiling alcohol and dried. It dissolves in concentrated sulfuric acid with a red color and dyes cotton from a red vat in very fast yellow shades.

EXAMPLE 6

2 parts of the dyestuff obtained according to Example 1, first paragraph, and pasted by precipitation from sulfuric acid, are vatted with 4 parts of sodium hydrosulfite and 8 parts by volume of caustic soda solution of 36° Bé. in 200 parts of water at 50° C. A dyebath is produced which contains in 2000 parts of water 2 parts of sodium hydrosulfite and 4 parts by volume of caustic soda solution of 36° Bé. and the above stock vat is added to this dyebath. Thereupon 100 parts of cotton are entered at 25° C., after 15 minutes 40 parts of sodium chloride are added and dyeing is carried out for one hour at 25 to 30° C. Thereupon the cotton is squeezed out, oxidized in the air, rinsed, acidified, again rinsed and if desired soaped at the boil. It is dyed in fast yellow shades.

What we claim is:

1. A vat dyestuff of the general formula

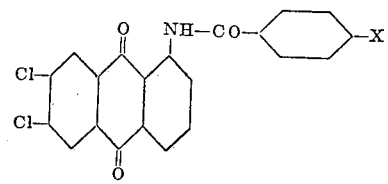

wherein X stands for a member of the group consisting of halogen and a phenylsulfone group.

2. The dyestuff of the formula

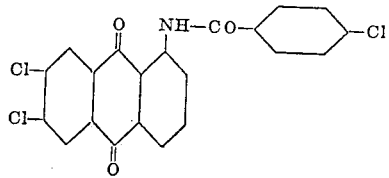

3. The dyestuff of the formula

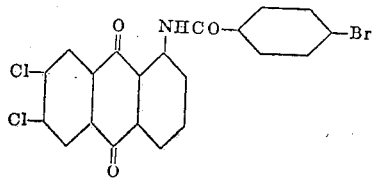

4. The dyestuff of the formula

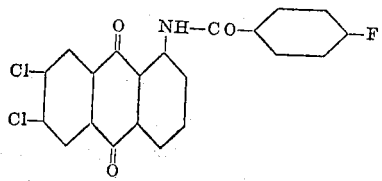

5. The dyestuff of the formula
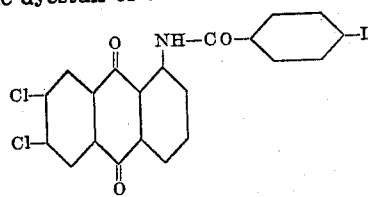
6. The dyestuff of the formula
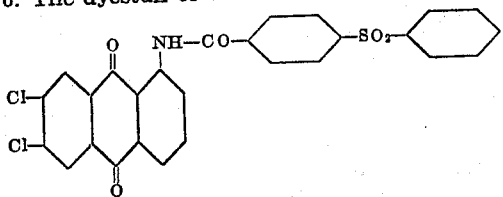
WALTER JENNY.
WALTER KERN.
REFERENCES CITED
The following references are of record in the file of this patent:
FOREIGN PATENTS
| Number | Country | Date |
|---|---|---|
| 585,798 | Great Britain | Feb. 27, 1947 |
OTHER REFERENCES
Elsivier's Encyclopedia of Organic Chemistry, vol. 13, pages 458 and 422 (1946).